(12) United States Patent
Jenkins (10) Patent No.: US 6,983,033 B1
(45) Date of Patent: Jan. 3, 2006

(54) GIMBLED SCANNING IDENTIFICATION DEVICE

(76) Inventor: Howard Jenkins, 101 E. McKinley Way, Poland, OH (US) 44514

(*) Notice: Subject to any disclaimer, the term of this patent is extended or adjusted under 35 U.S.C. 154(b) by 7 days.

(21) Appl. No.: 10/849,188

(22) Filed: May 20, 2004

(51) Int. Cl.
G06M 11/00 (2006.01)

(52) U.S. Cl. ............... 377/6; 340/5.92; 340/572.1; 209/551

(58) Field of Classification Search ........... 209/551; 340/572.1, 5.92; 377/6
See application file for complete search history.

(56) References Cited

U.S. PATENT DOCUMENTS

| | | | |
|---|---|---|---|
| 4,484,066 A | 11/1984 | DeBlieux et al. | 235/98 |
| 4,849,999 A | 7/1989 | Humphreys et al. | 377/6 |
| 4,897,859 A | 1/1990 | Tsukamoto et al. | 377/6 |

*Primary Examiner*—Margaret R. Wambach
(74) *Attorney, Agent, or Firm*—Harpman & Harpman (57) ABSTRACT

A device for automatic identification and counting of tagged articles massed together in a prescribed size bundles during linen cleaning and sorting processes. A three dimensional scanning of the bundles by multiple passes of a directional RF antenna oriented in different axial planes during each scan within a predescribed vertical path around the bundle.

9 Claims, 9 Drawing Sheets

GIMBLED SCANNING IDENTIFICATION DEVICE

BACKGROUND OF THE INVENTION

1. Technical Field

This invention relates to the identification and counting of clothing articles at the time of collection for processing after use. This is important since associated processing fees are based on an article count and given that there is a usual actual loss encountered during use. Clothing articles such as uniforms are received in large sacks or containers that must be counted to determine if all articles supplied to the user have been returned. Such accurate article count is difficult at best and is typically done by separation and counting by hand.

2. Description of Prior Art

Prior art devices of this type have relied on a number of different methods to determine actual count beyond a manual physical sorting and count, see for example U.S. Pat. Nos. 4,484,066, 4,849,999, 4,897,859.

In U.S. Pat. No. 4,484,066 a garment counting apparatus is disclosed wherein individual garments are "tagged" with a device defined as a source of electro-magnetic radiation and a sensor such as an electro-conductive coil through which the bag is passed thereby generating a current in the coil which can be numerically counted to determine the number of "tags" there within.

U.S. Pat. No. 4,849,999 is directed to a laundry transfer and counting apparatus that uses an article accelerator passageway in which articles are drawn therein by a source of vacuum located in spaced relation to the entrance thereto. This system thus separates and enumerates the articles as they pass.

U.S. Pat. No. 4,897,859 claims an apparatus for I.D. and counting linens in bags or bundles using x-rays. Markers are attached to the individual linens and then are passes under an x-ray source where the markers appear as recognizable shapes within the bundles and can be numerically counted.

SUMMARY OF THE INVENTION

An apparatus for automatically scanning a group of bundled articles and determining their number and type by receiving RF signals from individual transmitter tags on each article. An integrated directional antenna passes around the bundle on multiple ascending and descending planar receiving paths disseminating their number and individual RF signals achieving an accurate actual count for articles within the bundles so tagged.

DESCRIPTION OF THE PREFERRED EMBODIMENT

Figure 1:
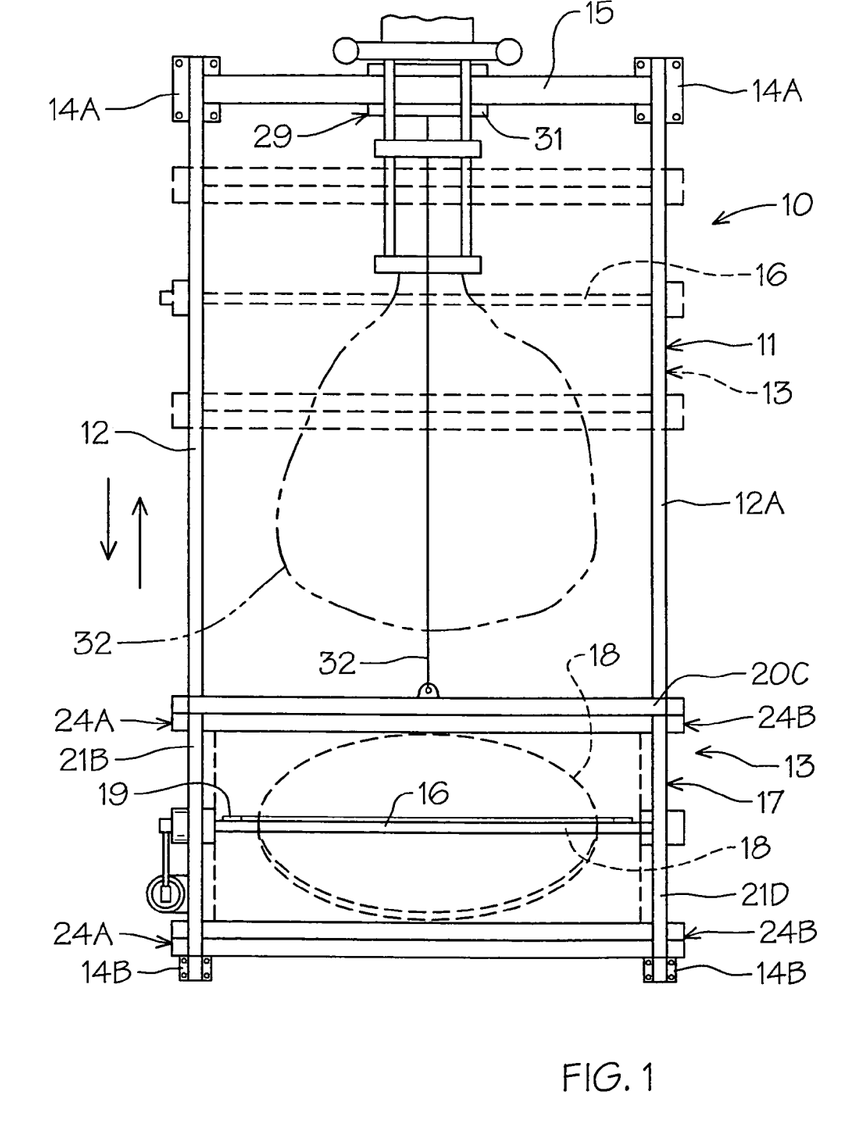
FIG. 1 is a front elevational view of the scanning device of the invention.
Figure 2:
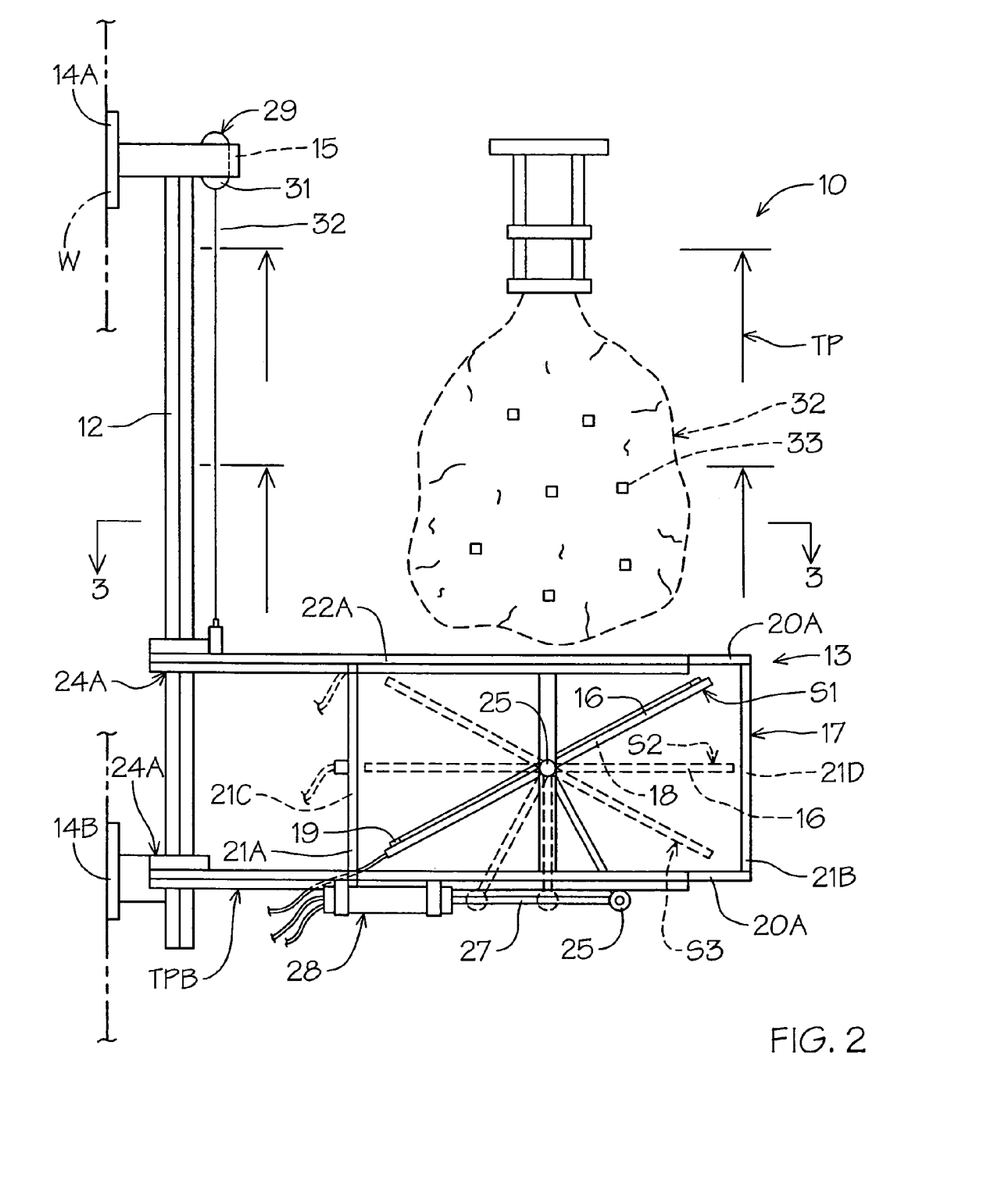
FIG. 2 is a side elevational view thereof.

An automatic identification and counting device 10 of the invention can be seen in FIGS. 1 and 2 of the drawings having a main support and guide frame 11. The support and guide frame 11 has a pair of spaced parallel elongated frame post elements 12 and 12A extending in vertical orientation with a scanning head assembly 13 movably positioned thereon. The frame elements 12 and 12A define vertical guide tracks for the scanning head assembly 13 and may be secured (as in this example) to an adjacent wall surface S by pairs of wall attachment brackets 14A and 14B at their respective ends. The upper wall attachment bracket pair 14A extends outwardly from the wall W to the respective front post elements 12 and ends at 12A. An upper support frame bracket 15 extends between the ends of the upper bracket pairs 14A in spaced relation to the front post elements 12 and 12A.

Figure 3:
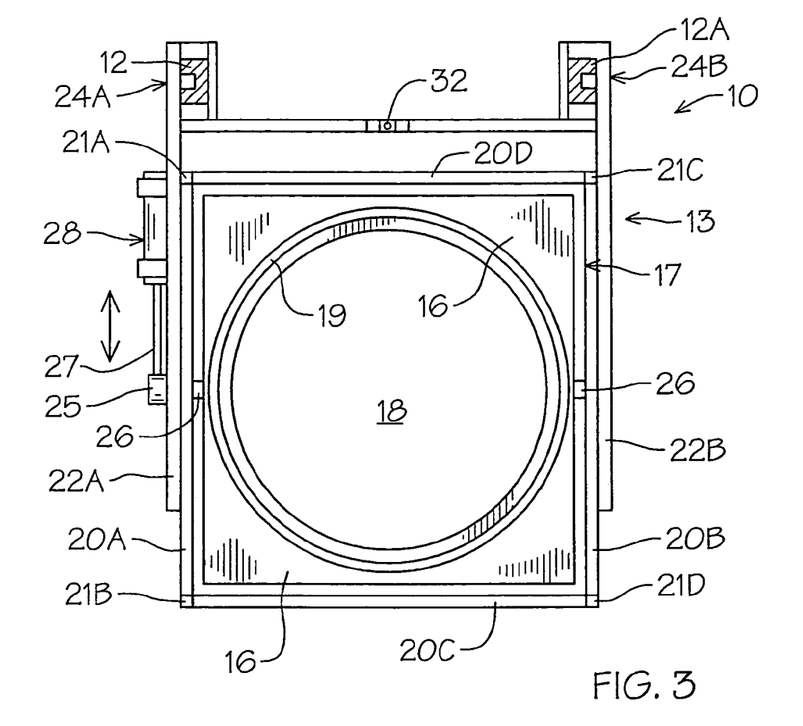
FIG. 3 is a top plan view on lines 3—3 of FIG. 2.
Figure 4:
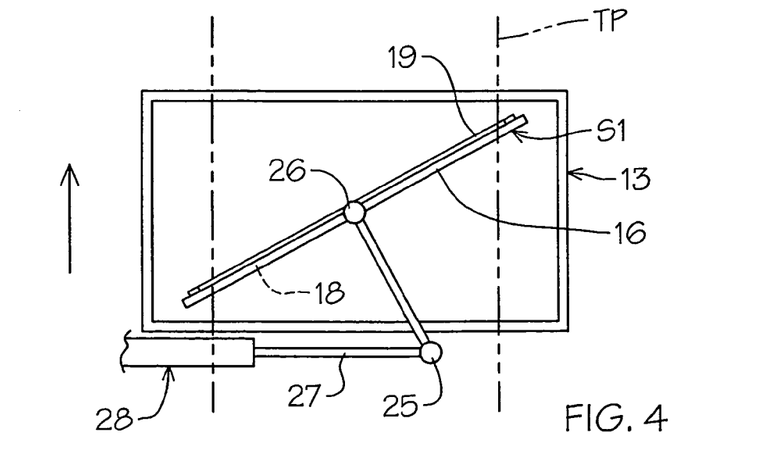
FIG. 4 is a side elevational graphic representation of the scanning antenna in a first vertical ascension scan position.
Figure 5:
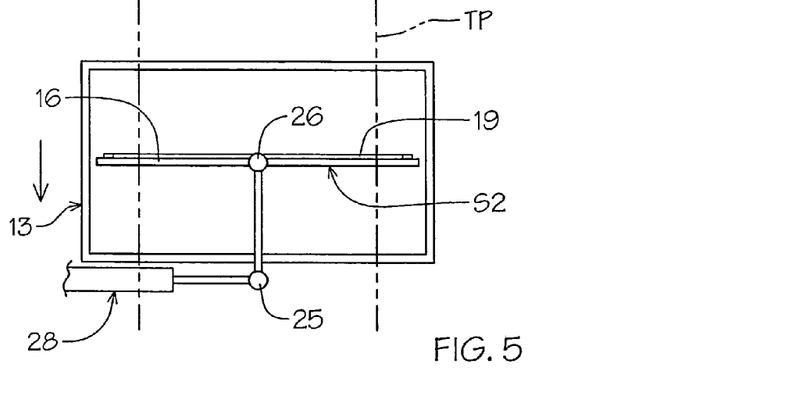
FIG. 5 is a side elevational graphic representation of the scanning antenna in first vertical descending scanning position.
Figure 6:
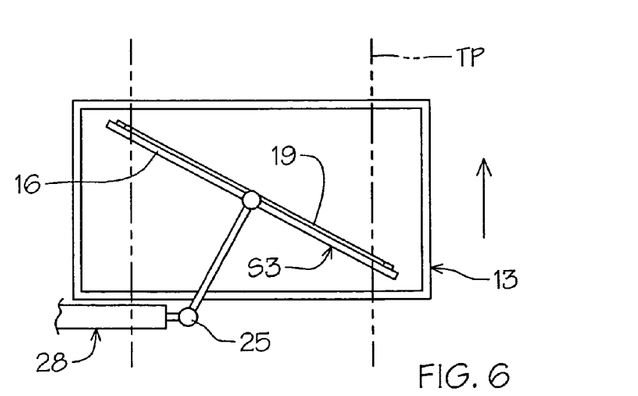
FIG. 6 is a side elevational graphic representation of the scanning antenna in a second vertical ascending scan position.
Figure 7:
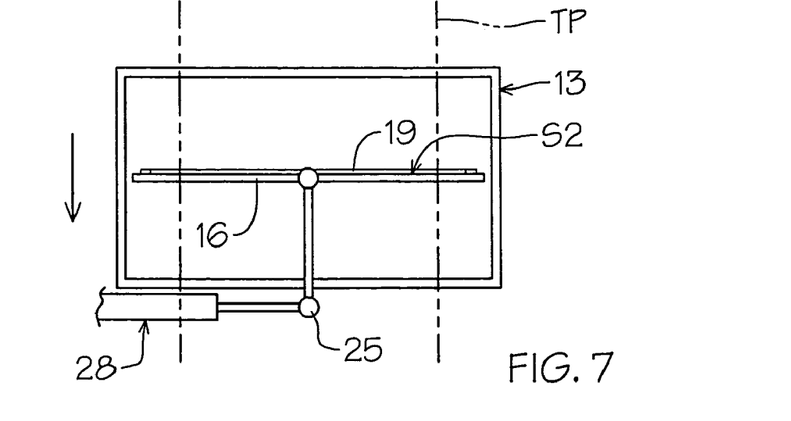
FIG. 7 is a side elevational graphic representation of the scanning antenna in a second vertical descending scan position.

The scanning head assembly 13 has an antenna table 16 positioned pivotally within a frame housing 17. The antenna table 16 is generally flat with a circular opening at 18 centrally located therein. The RF antenna element 19 is positioned about the opening at 18 defining a "scanning loop". The frame housing 17 has pairs of oppositely disposed vertically spaced parallel frame elements 20A, 20B, 20C and 20D interconnected at their respective intersections by multiple corner posts 21A, 21B, 21C, and 21D. Secondary support frame extension pairs 22A and 22B are secured to and extend from the respective pair elements 20A, 20B, 20C and 20D with transverse interconnecting supports 23A and 23B therebetween. The free ends of the extension pairs 22A and 22B have guide block fittings 24A and 24B inter-engaged on the guide track frame element 12 which allows for vertical travel thereon. An activation fitting 25 on a pivot point 26 of the antenna table 16 has an armature 27 extending therefrom in communication with an air cylinder assembly 28, best seen in FIGS. 2 and 3 of the drawings which is connected to a source of compressed air, not shown. The antenna table 16 and integral RF antenna 19 can be tilted to three sensing planes S1, S2 and S3 as illustrated in FIGS. 2, and 4–6 of the drawings.

An antenna head drive assembly 29 is positioned on the upper support frame bracket 15. The drive assembly 29 has an electric motor gear assembly 31 with a cable 32 secured to the scanning head assembly 13 illustrated in just one example of a number of different drive systems available which will be evident to those skilled in the art and is not therefore limited to same as such.

Figure 8:
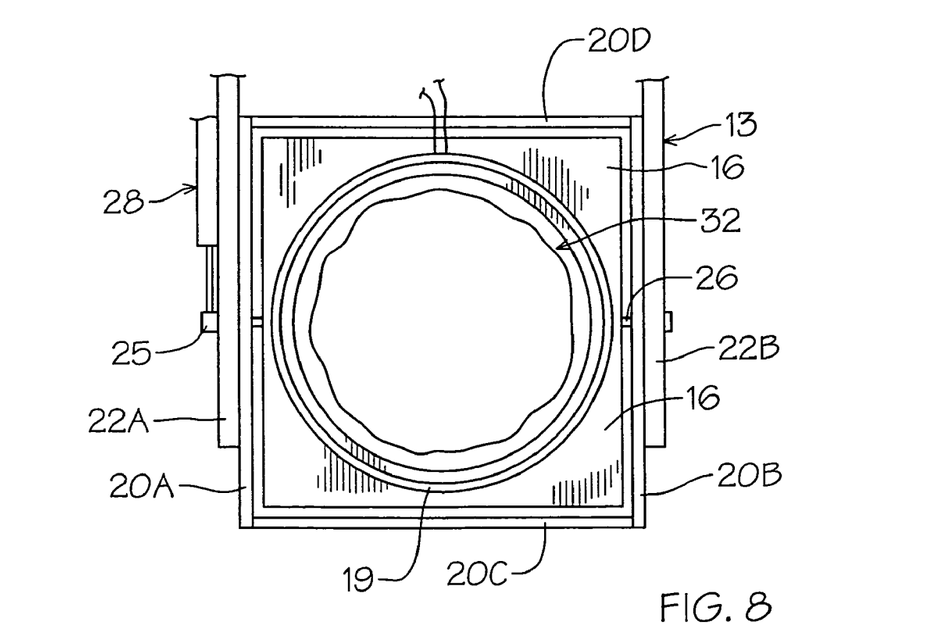
FIG. 8 is a top plan view of the scanning antenna in first vertical ascending scan position with a scannable border therein.

In operation, as best seen in FIGS. 1, and 9–13 of the drawings, a containment bundle 32 shown in broken lines having multiple clothing articles (not shown) within each of which has an RF transmitter tag 33 attached thereto is positioned within the travel path TP of the scanning head assembly 13 as seen in FIG. 2 of the drawings. The scanning head 13 is then activated with the antenna table 16 tilted to the first ascending sensing plane position S1 and raised by the drive assembly 29 along the frame elements 12 and 12A with the bundle 32 passing through the antenna table opening at 18 and the sensing plane S1 of the RF antenna 19 as shown in broken and solid lines in FIGS. 8 and 11 of the drawings.

Figure 9:
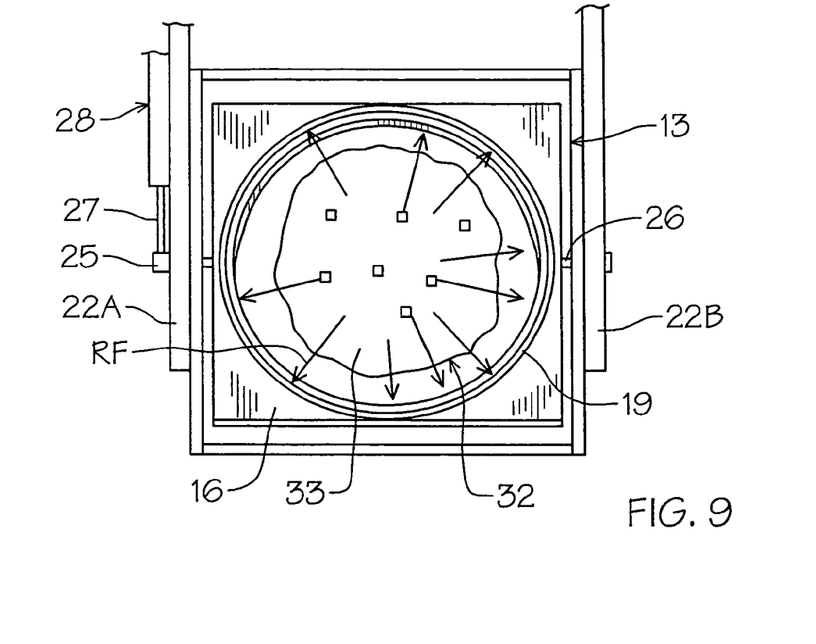
FIG. 9 is a top plan view of the scanning antenna in first and second vertical descending scan position.
Figure 10:
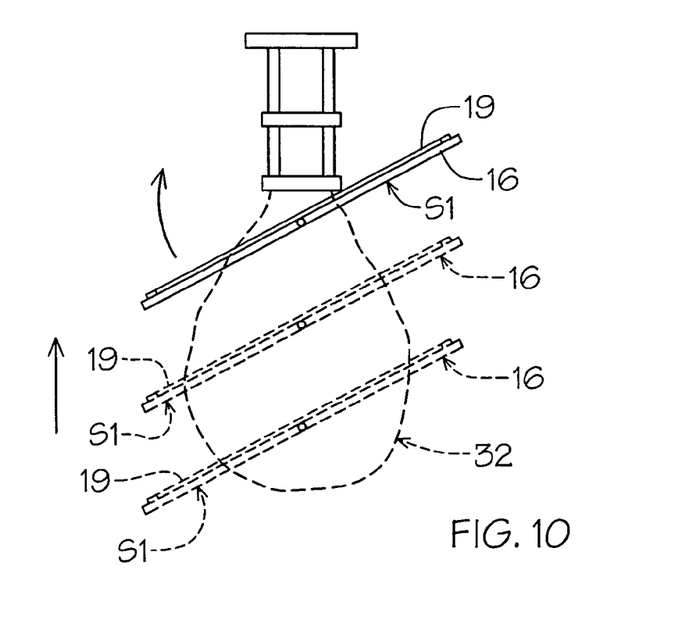
FIG. 10 is a side elevational graphic representation in solid and broken lines of the scanning antenna in first vertical ascending position around a bundle.
Figure 11:
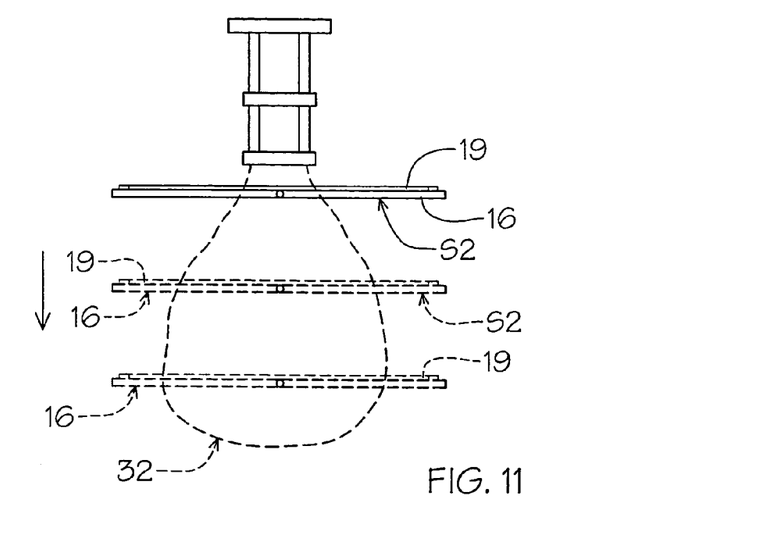
FIG. 11 is a side elevational graphic representation in solid and broken lines of the scanning antenna in first and second vertical descending position.
Figure 12:
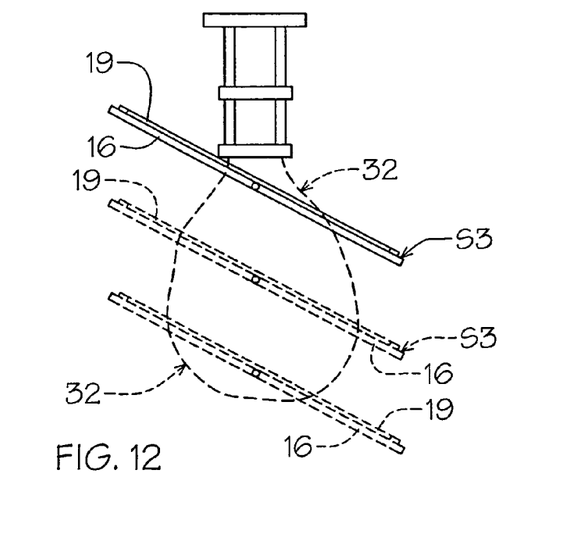
FIG. 12 is a side elevational graphic representation in solid and broken lines of the scanning antenna in second vertical ascending position.

At the top of the travel path TP the antenna table 16 is tilted to a horizontal position defined as vertical descension position S2 and scanning head 13 is lowered down passing through the scanning plane S2 of the scanning antenna 19 back over the length of the bundle 32 as illustrated in FIGS. 9 and 12 of the drawings.

At the bottom of the travel path TP (B) the antenna table 16 is tilted again to the second vertical ascension position S3 and the scanning head assembly 13 is pulled back up frame elements 12 and 12A ascending the travel path TP with the bundle 32 passing through the sensing plane S3 of the antenna 19.

Again at the top of the travel path TP, the antenna table 16 is repositioned back to a second descending position S2 illustrated in FIGS. 9 and 12 of the drawings and the scanning head assembly 13 travels back down, in essence around the bundle 27 which passes through the scanning plane S2 of the antenna 19, completing the multiple scans.

It will be evident from the above description that as multiple oscillating scans take place utilizing the re-orientation of the RF antenna sensing planes S1, S2 and S3 for each scan travel path that an effective detailed scan of the bundle 32 is achieved in which all of the respective RF 33 (tags) are detected assuring an accurate identification and count thereof.

It will be seen that only by multiple passes of the RF antenna 19 over the bundle 32 in which during each successive pass the antenna planar scanning relationship orientation is changed that a true effective accurate and quick count be made of the associated articles i.e. tags 33 within the bundle.

Figure 13:
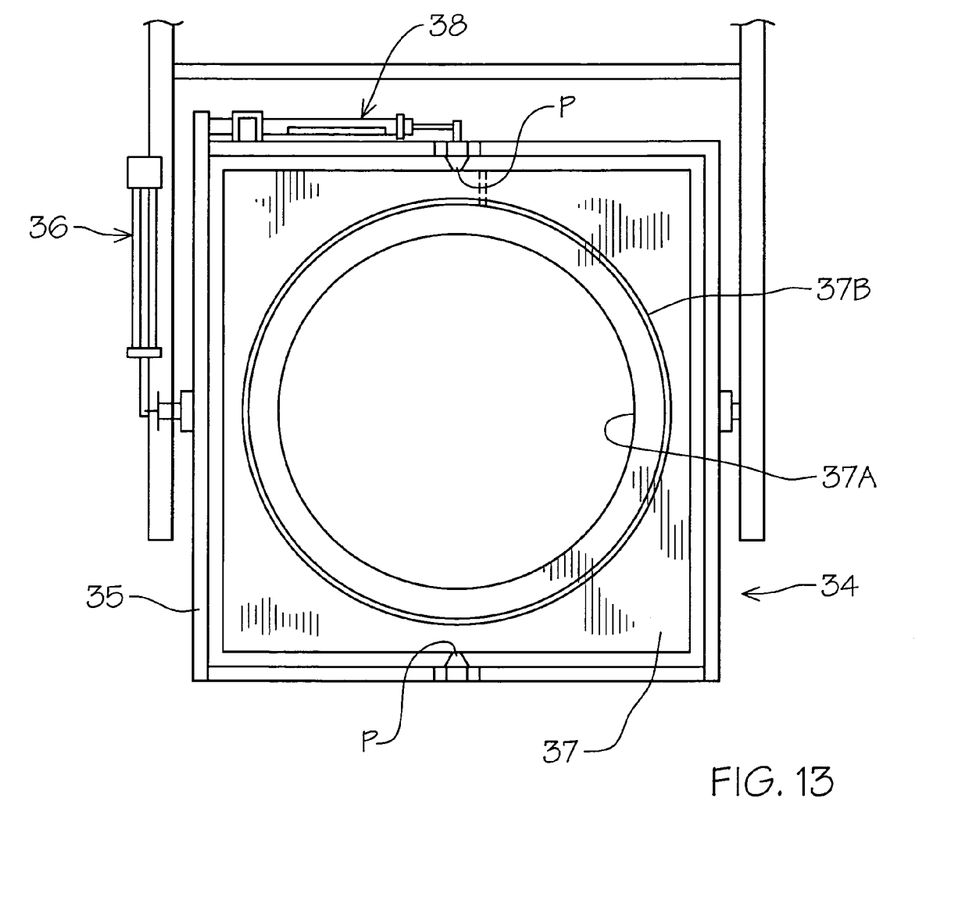
FIG. 13 is a top plan view of an alternate form of the invention.
Figure 14:
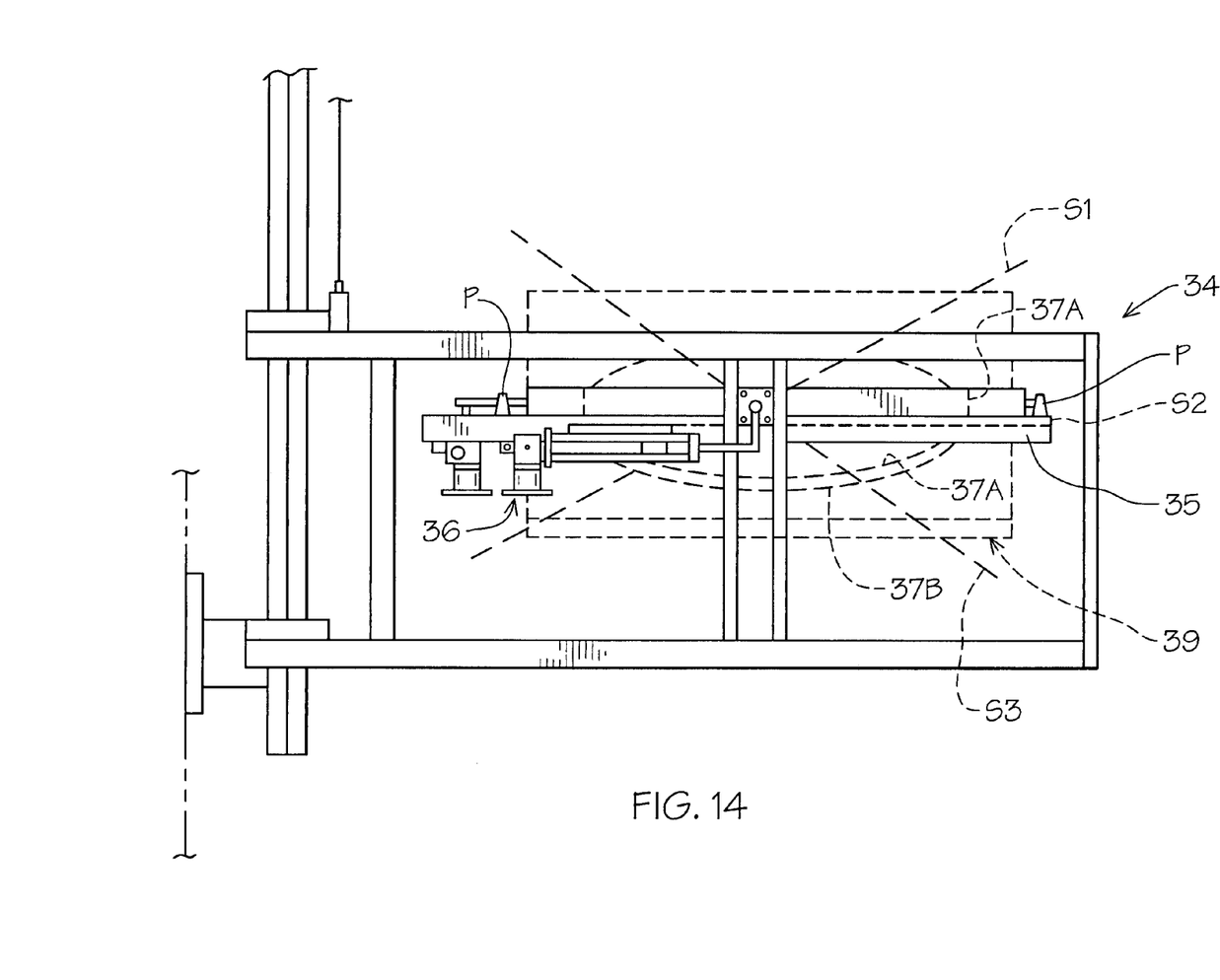
FIG. 14 is a side elevational view thereof.

Referring now to FIGS. 13 and 14 of the drawings, a universal gimble action assembly form of the invention can be seen. A second scanning head assembly 34 has a secondary antenna table support frame 35 pivotally secured within. A drive activation linkage assembly 36 provides for repositioning of the secondary antenna table support frame 35 through hereinbefore described sensing plane positions S1–S3.

A secondary antenna table 37 is pivotally positioned at P within the secondary antenna table support frame 35 and has a circular opening at 37A therein with a corresponding RF antenna element 37B thereabout. A secondary drive activation linkage assembly 38 provides for independent repositioning of the secondary antenna table 37 within the table support frame 35 as indicated by broken lines at 39.

It will be evident from the above description that by providing the movable secondary antenna table support frame 35 that the secondary scanning head assembly 34 imparts a "gimble" dual directional repositioning of the secondary antenna table 37, associated RF antenna element 37B thereon. Thus the orientation of the movable secondary table support frame 35 and the movable secondary antenna table 37 within provides for a variety of multi-angular planar orientation shifts of the RF antenna scanning loop within its travel path about the containment bundle 32 assuring that all respective RF transmitter tags 33 as previously described will be red despite their orientation within the bundle 32.

It will be apparent to those skilled in the art that a new and novel article counter has been illustrated and described and that various changes and modifications may be made thereto without departing from the spirit of the invention.

Therefore I claim:

1. An apparatus for identification and counting multiple articles in a confined mass,
    a source of RF energy attached to each of said articles within said mass,
    an antenna for receiving signals from said sources of RF energy,
    means for selectively positioning said antenna around said mass articles for receiving multiple RF signals therefrom.

2. The apparatus for identifying and counting multiple articles in a confined mass set forth in claim 1 wherein said source of RF energy attached to each of said articles comprises an RF transmitter.

3. An apparatus for identifying and counting multiple articles in a confined mass set forth in claim 1 wherein said articles comprise, garments such as uniforms.

4. The apparatus for identifying and counting multiple articles in a confined mass set forth in claim 1 wherein said means for selectively positioning said antenna around said massed articles comprises,
    a movable antenna support table with a movable frame support housing.

5. The apparatus for identifying and counting multiple articles in a confined mass set forth in claim 4 wherein said antenna support table is pivotally positionable within a pivoted antenna table support frame in said movable support housing for multiple tri-directional planar positioning of said antenna within.

6. The apparatus for identifying and counting multiple articles in a confined mass set forth in claim 4 wherein said frame support housing is movable from a first position in spaced relation to said articles, to a second position encompassing said articles.

7. The apparatus for identifying and counting multiple articles in a confined mass set forth in claim 4 wherein said antenna is movably positioned from a first ascending position about the mass to a second descending position about the mass to a third descending position about the mass to the second descending position about the mass.

8. The apparatus for identifying and counting multiple articles in a confined mass set forth in claim 4 wherein said means for selectively positioning said antenna around said massed articles further comprises, a first drive activation linkage assembly in communication with an antenna table support frame and said movable frame support housing, a secondary drive activation linkage assembly in communication between said antenna table support frame and said antenna support table.

9. A method for counting articles, comprising the steps of,
    a. attaching individual sources of RF radiation to each article,
    b. repeatedly scanning by passing an RF receiving antenna about said articles,
    c. selectively repositioning said antenna in multiple planes for each scan pass,
    d. detecting the independent sources of RF radiation by said repositionable RF antenna during each scan and determining the number of articles by repeated multiple scans of different RF antenna orientation.

* * * * *